(12) United States Patent
Schwoeppe

(10) Patent No.: US 10,471,693 B2
(45) Date of Patent: Nov. 12, 2019

(54) ACCELERATED BONDING OF ISOCYANATE FUNCTIONAL ADHESIVE TO FIBER REINFORCED PLASTICS

(71) Applicant: DOW GLOBAL TECHNOLOGIES LLC, Midland, MI (US)

(72) Inventor: Dirk Schwoeppe, Freienbach (CH)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 184 days.

(21) Appl. No.: 15/609,447

(22) Filed: May 31, 2017

(65) Prior Publication Data

US 2017/0274634 A1 Sep. 28, 2017

Related U.S. Application Data

(62) Division of application No. 14/430,614, filed as application No. PCT/US2013/025538 on Feb. 11, 2013, now Pat. No. 9,694,565.

(60) Provisional application No. 61/710,917, filed on Oct. 8, 2012.

(51) Int. Cl.

| | |
|---|---|
| *B32B 5/02* | (2006.01) |
| *B32B 7/12* | (2006.01) |
| *B32B 37/00* | (2006.01) |
| *B32B 37/12* | (2006.01) |
| *C08G 18/10* | (2006.01) |
| *C08K 5/00* | (2006.01) |
| *C08K 5/12* | (2006.01) |
| *C08L 75/04* | (2006.01) |
| *C09J 5/02* | (2006.01) |
| *C09J 5/06* | (2006.01) |
| *C09J 11/06* | (2006.01) |
| *C09J 175/04* | (2006.01) |

(52) U.S. Cl.
CPC ............ *B32B 37/0038* (2013.01); *B32B 5/02* (2013.01); *B32B 7/12* (2013.01); *B32B 37/1284* (2013.01); *C08G 18/10* (2013.01); *C08L 75/04* (2013.01); *C09J 5/02* (2013.01); *C09J 5/06* (2013.01); *C09J 11/06* (2013.01); *C09J 175/04* (2013.01); *B32B 2037/1269* (2013.01); *B32B 2250/02* (2013.01); *B32B 2305/08* (2013.01); *B32B 2309/02* (2013.01); *B32B 2309/04* (2013.01); *B32B 2310/0812* (2013.01); *C08K 5/0025* (2013.01); *C08K 5/12* (2013.01); *C09J 2475/00* (2013.01)

(58) Field of Classification Search
CPC ....... B32B 5/025; B32B 7/12; B32B 37/0038; B32B 37/1284; B32B 2037/1269; B32B 2250/02; B32B 2305/08; B32B 2309/02; B32B 2309/04; B32B 2310/0812; B32B 5/02; C08K 5/0025; C08K 5/12; C08L 75/04; C09J 5/06; C09J 5/02; C09J 11/06; C09J 175/04; C09J 2475/00; C08G 18/10; Y10T 428/31551

See application file for complete search history.

(56) References Cited

U.S. PATENT DOCUMENTS

| | | | |
|---|---|---|---|
| 3,707,521 A | 12/1972 | De Santis | |
| 3,779,794 A | 12/1973 | De Santis | |
| 3,855,307 A * | 12/1974 | Rony ................... | B01J 31/1616 502/161 |
| 4,282,285 A | 8/1981 | Mohiuddin | |
| 4,345,053 A | 8/1982 | Rizk et al. | |
| 4,374,237 A | 2/1983 | Berger et al. | |
| 4,525,511 A | 6/1985 | Kirby et al. | |
| 4,625,012 A | 11/1986 | Rizk et al. | |
| 5,115,086 A | 5/1992 | Hsieh | |
| 5,238,993 A | 8/1993 | Hsieh | |
| 5,242,984 A | 9/1993 | Dillman et al. | |
| 5,466,727 A | 11/1995 | Hsieh | |
| 5,468,317 A | 11/1995 | Hsieh | |
| 5,623,044 A | 8/1997 | Chiao | |
| 5,792,811 A | 8/1998 | Bhat | |
| 5,853,857 A | 12/1998 | Mahmood et al. | |
| 6,015,475 A | 1/2000 | Hsieh et al. | |
| 6,053,971 A | 4/2000 | Lin | |
| 6,512,033 B1 | 1/2003 | Wu | |

(Continued)

FOREIGN PATENT DOCUMENTS

| | | |
|---|---|---|
| DE | 19924139 A1 | 11/2000 |
| EP | 1433802 B1 | 10/2007 |
| EP | 2059573 B1 | 1/2011 |
| EP | 1578834 B1 | 2/2015 |
| SU | 712417 A | 1/1980 |
| WO | 2010/30519 A1 | 3/2010 |

OTHER PUBLICATIONS

Kohler et al., *Journal of the American Chemical Society*, vol. 49, p. 3181. (1927).
PCT Transmittal of IPRP. PCT/US2013/025538. Mailed on Dec. 19, 2014.
PCT Notification of ISR and Opinion of the ISA. PCT/US2013/025538, dated Sep. 19, 2013.
PCT Written Opinion Examining Authority, PCT/US2013/025538, dated Oct. 6, 2014.
Examination Report from the European Patent Office for Application No. 13705698.2-1303, dated Apr. 21, 2016.

*Primary Examiner* — Patrick D Niland

(74) *Attorney, Agent, or Firm* — The Dobrusin Law Firm, P.C.

(57) ABSTRACT

The present invention relates to a composition comprising: a) one or more organometallic compounds; b) one or more high boiling point solvents; and c) one or more low boiling point solvents. The invention further relates to a system comprising a) one or more organometallic compounds; b) one or more high boiling point solvents; and c) one or more low boiling point solvents and an isocyanate functional adhesive. The isocyanate functional adhesive may be a one part or a two part adhesive. The invention further relates to methods of bonding substrates together using the compositions of the invention.

20 Claims, No Drawings

(56) References Cited

U.S. PATENT DOCUMENTS

| | | |
|---|---|---|
| 6,709,539 B2 | 3/2004 | Zhou |
| 6,965,008 B2 | 11/2005 | Symietz et al. |
| 7,416,599 B2 | 8/2008 | Hsieh et al. |
| 7,892,395 B2 | 2/2011 | Tribelhorn |
| 2002/0100550 A1 | 8/2002 | Mahdi et al. |
| 2003/0084995 A1 | 5/2003 | Zhang |
| 2005/0126683 A1 | 6/2005 | Hsieh et al. |
| 2006/0124225 A1 | 6/2006 | Wu et al. |
| 2008/0199607 A1 | 8/2008 | Hsieh et al. |
| 2010/0059179 A1 | 3/2010 | Tribelhorn et al. |
| 2010/0326593 A1 | 12/2010 | Harvey et al. |

\* cited by examiner

ACCELERATED BONDING OF ISOCYANATE FUNCTIONAL ADHESIVE TO FIBER REINFORCED PLASTICS

FIELD OF THE INVENTION

The invention relates generally to systems for enhancing bonding of isocyanate functional adhesives to fiber reinforced plastics. The invention also relates to methods for bonding substrates together wherein at least one substrate comprises fiber reinforced plastic.

BACKGROUND OF THE INVENTION

Reactive isocyanate functional (polyurethane or urea forming) adhesives are used for bonding a wide variety of substrates together. Such adhesives are utilized in construction, vehicle manufacture, assembly of electronic subassemblies and devices, toys and the like, and have found widespread use because they allow for reasonable processing conditions and exhibit good adhesion to many substrates. For many substrates the processes used to assemble parts using reactive adhesives require cleaning of the substrate surface to remove contaminants, sometimes the system used to clean the surface is referred to as a wipe. In many processes a primer or activator is utilized to facilitate adhesion of the adhesive to the substrate. A primer or activator system typically contains a film forming resin, a solvent and one or more of an adhesion promoter, catalyst, curing agent or crosslinking agent. See for example DE 19924139. Primers require the formation of a film on the substrate surface which bonds to the substrate surface and to the adhesive surface. Many primers are moisture cure primers which require the presence of moisture to form an adequate film. Examples of primers are U.S. Pat. Nos. 5,115,086; 5,238,993; 5,466,727; 5,468,317; and 5,792,811, all incorporated herein by reference. Non-film forming solutions of adhesion promoters, often called activators, are used which may contain groups intended for reaction with the substrate and the adhesive, examples include U.S. Pat. No. 6,053,971, incorporated herein by reference. Examples of adhesion promoters useful in activators include silanes, isocyanate containing compounds, titanates and zirconates such as disclosed in US Patent 2005/0126683 and US 2006/0124225, all incorporated herein by reference. US 2010/0059179 discloses a system, or kit, comprising i) a stable solution or dispersion of a catalyst for the curing of a reactive adhesive system; and in a separate part ii) an uncured reactive adhesive system wherein the catalyst of part i) accelerates the cure of the reactive adhesive system. Also disclosed is a method of bonding a reactive adhesive to a substrate comprising: a) contacting a catalyst for the curing of the reactive adhesive in a volatile solvent with the surface of the substrate to which the adhesive will be bonded; b) allowing the volatile solvent to volatilize away, c) contacting a reactive adhesive with the surface treated in step a) and d) allowing the adhesive to cure.

One-part isocyanate functional adhesives contain one or more isocyanate functional prepolymers and a catalyst for the cure of the adhesive, which cure as a result of exposure to moisture. The cure rate of a primer and a one part adhesive must be matched to allow the adhesive to link up to the primer. For primers which cure or form a film with exposure to moisture, the adhesive and the primer compete for moisture. With the adhesive applied over the primer, it is often difficult for moisture to diffuse to the primer and the primer may not adequately form a film and the bond of the adhesive system to the substrate may not be sufficient for use.

A two-part polyisocyanate based adhesive comprises, in one part, a polyisocyanate or an isocyanate functional prepolymer and in a second part a curing agent and catalyst for the reaction of the curing agent with isocyanate groups. The curing agent is a compound having on average more than one active hydrogen atom, for instance an amine or hydroxyl moiety. Examples of such systems include those disclosed in the commonly owned patent application titled COMPOSITION USEFUL AS AN ADHESIVE FOR INSTALLING VEHICLE WINDOWS filed in the United States on Jun. 3, 2007 having a Ser. No. 11/824,984 and filed in the PCT on Jun. 5, 2007 having a serial number PCT/US07/013; U.S. Pat. No. 6,965,008; EP 1433802 and EP 1578834, all incorporated herein by reference. Two-part adhesives cure much faster than one-part adhesives. The problem with utilizing two-part adhesives with primers is that the adhesives can cure faster than the primer cures and not link up to the primer or substrate surface. To enhance productivity many users desire fast curing two part adhesives which when applied to substrates can experience bubbling due to the formulation. Bubbling can inhibit adhesion and reduce the strength of the bond. In some processes, the substrate is subjected to abrasive processes, such as grinding to shape or contour the ultimate part for use. For certain substrates, such as fiber reinforced plastics surface treatment may be desirable to enhance adhesion. Surface treatments include mechanical surface abrasion, corona treatment, chemical etching, priming and the like. Treatment of substrate surface can enhance adhesion or can make adhesion more challenging. Also, the adhesive which contains isocyanate groups can tie up moisture needed to cure the primer. The time period between primer application and application of the adhesive to the substrate needs to allow for adequate film build, otherwise the system may not completely link up and form good bonds along all of the layers of the adhesive system.

In modern industrial processes, there is a need to move parts and to place loads on adhesive systems as soon as possible. If this is attempted before the system builds adequate strength is built up a failure of the adhesive system resulting in faulty parts or articles. Fiber reinforced plastics provide the benefits of thermoplastic matrices with higher strength introduced as a result of the presence of fibers. Adhering adhesives to fiber reinforced plastics can be challenging due to use of the different materials and the surface morphology.

What is needed is a system for bonding parts comprising fiber reinforced plastic together or to other substrates using reactive adhesives which avoid these problems and which matches the cure rate of the reactive adhesive to the link up speed to the substrate or the primer system, enhances bonding to abraided surfaces and avoids bubbling.

SUMMARY OF THE INVENTION

The present invention relates to a composition comprising: a) one or more organometallic compounds; b) one or more high boiling point solvents; and c) one or more low boiling point solvents. The invention further relates to a system comprising a) one or more organometallic compounds; b) one or more high boiling point solvents; and c) one or more low boiling point solvents and an isocyanate functional adhesive. The isocyanate functional adhesive may be a one part or a two part adhesive.

The invention further relates to a method comprising: i) contacting a surface or a portion of the surface of a first substrate comprising fiber reinforced composite with a composition comprising a) one or more organometallic compounds; and b) one or more low boiling point solvents; and/or c) one or more high boiling point solvents; ii) contacting an isocyanate functional adhesive with the surface or a portion of the surface of the first substrate contacted with the composition applied thereto; iii) contacting the first substrate with a second substrate with the isocyanate functional adhesive disposed between the two substrates; iv) allowing the isocyanate functional adhesive to cure and bond the substrates together. The contacted substrates may be heated to accelerate cure of the isocyanate functional adhesive, for example by induction heating.

The adhesive bonds directly to the substrate surface not to a separate primer layer. Preferably, once the low boiling solvent volatilizes away, the substrate has the organometallic compound, and optionally the high on the surface to be bonded. In one embodiment, the organometallic compound, and optionally the high boiling solvent, are the only significant species deposited on the surface of the substrates. The low boiling solvent, in addition, to carrying the organometallic compound also can function to clean the surface of the substrate. In another embodiment, the organometallic compound solution contains a marker which is used to identify the application of the organometallic compound to the substrate surface. In one embodiment, after application only organometallic compound and marker, optionally high boiling solvent, are located on the surface of the substrate to which the adhesive is to be bonded. In another embodiment, the solution does not contain a film forming resin.

DETAILED DESCRIPTION

One or more as used herein means that at least one, or more than one, of the recited components may be used as disclosed. Nominal as used with respect to functionality means the theoretical functionality, this can be calculated from the stoichiometry of the ingredients used. The actual functionality is different due to imperfections in raw materials, incomplete conversion of the reactants and formation of by-products. Durability in this context means that the composition once cured remains sufficiently strong to perform its designed function, in the embodiment wherein the cured composition is an adhesive, the adhesive holds substrates together for the life or most of the life of the structure containing the cured composition. As an indicator of durability, the curable composition (e.g. adhesive) preferably exhibits excellent results during accelerated aging. Preferably this means that after a set of substrates bonded with the composition of the invention is exposed to heat aging, the failure mode in Quick Knife adhesion or Lap Shear testing is cohesive, meaning the composition breaks before the bond of the composition to the substrate breaks. Isocyanate content means the weight percent of isocyanate groups in the designated component, such as prepolymer, which can be measured by analytical techniques known to one skilled in the art, for example by potentiometric titration with an active hydrogen containing compound, such as dibutyl amine. Heteroatom means nitrogen, oxygen, sulfur and phosphorus, more preferred heteroatoms include nitrogen and oxygen. As used herein percent by weight or parts by weight refer to, or are based on, the weight or the curable compositions unless otherwise specified. The term isocyanate-reactive compound as used herein includes any organic compound having nominally at least two isocyanate-reactive moieties. Isocyanate reactive moiety, an active hydrogen containing moiety, refers to a moiety containing a hydrogen atom which, because of its position in the molecule, displays significant activity according to the Zerewitinoff test described by Wohler in the *Journal of the American Chemical Society*, Vol. 49, p. 3181 (1927). Illustrative of such isocyanate reactive moieties, such as active hydrogen moieties, are —COOH, —OH, —NH$_2$, —NH—, —CONH$_2$, —SH, and —CONH—. Preferable active hydrogen containing compounds include polyols, polyamines, polymercaptans and polyacids, more preferably polyols, and most preferably polyether polyols. The term solution as used herein refers to the composition comprising the organometallic compound, a low boiling point solvent and/or a high boiling point solvent.

The invention relates to systems to enhance bonding of isocyanate based curable systems, such as adhesives, to fiber reinforced plastics. Such systems comprise a mixture of one or more organometallic compounds and one or more low boiling solvents, and/or one or more high boiling solvents. The bonding system further comprises one or more curable isocyanate functional systems, which can be one or two parts. The organometallic compound can be any organometallic compound that enhances or catalyzes the reaction of isocyanate groups with isocyanate reactive groups. Such compounds comprise one or more metals and one or more organic ligands bonded to the one or more metals. The metals are preferably one or more of tin, titanium, zinc, bismuth or zirconium, more preferably tin, zinc or bismuth and most preferably tin. The organic ligand can be any ligand that enhances the catalysis of the reaction of isocyanate groups with isocyanate reactive groups. Such ligands can include alkyl groups, esters, carboxylic acids, ethers, mercaptides, and the like. Preferred organometallic compounds include metal alkanoates, alkyl metal oxides, metal alkanoates, dialkyl metal carboxylates and metal mercaptides. More preferred organometallic compounds include alkyl tin oxides include dialkyl tin oxides, such as dibutyl tin oxide and its derivatives. The organometallic compounds are preferably dialkyltin dicarboxylates or a dialkyltin dimercaptides. The preferred dialkyl dicarboxylates include 1,1-dimethyltin dilaurate, 1,1-dibutyltin diacetate and 1,1-dimethyl dimaleate. Preferred metal alkanoates include bismuth octoate or bismuth neodecanoate. The organometallic compound is present in an amount of about 0.1 percent by weight or greater based on the weight of the solution, more preferably 0.5 percent by weight or greater. The organometallic compounds are present in an amount of about 10.0 percent or less based on the weight of the solution, more preferably 5.0 percent by weight or less and most preferably 2.0 percent by weight or less.

The composition contains a low boiling solvent which functions to dissolve and/or carry the organometallic compounds and other ingredients. Low boiling solvent means the solvent is liquid at ambient temperatures, about 20 to 23° C., and is volatile at temperatures of about 15° C. to about less than 180° C. at standard pressure (14.696 psi, 101.3 kPa). The solvent can be any solvent or dispersant which forms a stable solution or dispersion of the catalyst. "Stable" means the catalyst remains in dispersion or solution until applied to the substrate surface. Preferably, the solvent or dispersant is volatile under conditions that the solution or dispersion is applied to the substrate. It is desirable for the solvent or dispersant to evaporate away or flash off as rapidly as possible after application to the substrate. Among preferred solvents or dispersants are cycloaliphatic hydrocarbons, aliphatic hydrocarbons, aromatic hydrocarbons, ketones, esters, ethers or alcohols with cycloaliphatic hydrocarbons, aliphatic hydrocarbons, aromatic hydrocarbons being more preferred. More preferred solvents or dispersants are aliphatic hydrocarbons. Among preferred aliphatic hydrocarbons are hexane, heptane and octane. Among preferred cycloaliphatic hydrocarbons is cyclohexane. Among preferred aromatic hydrocarbons are toluene and xylene. Preferably the low boiling solvent forms a solution with the organometallic compound. Preferably, the low boiling solvent is present in an amount of about 0 percent by weight or greater based on the weight of the solution, more preferably about 1 percent by weight or greater, even more preferably 75 percent by weight or greater and most preferably about 80 percent by weight or greater. Preferably, the low boiling solvent is present in an amount of about 99.5 percent by weight or less based on the weight of the solution, more preferably about 90 percent by weight or less and most preferably about 85 percent by weight or less.

The solution may further comprise one or more high boiling solvents which may be present to improve the interface of the organometallic compounds with the substrate surface. Preferably the high boiling solvent wets the surface of substrates the composition is contacted with and is compatible with adhesives contacted with the substrates, such as isocyanate functional adhesives. High boiling in this context means a compound which flows at ambient temperatures and which exhibits a boiling point of about 180° C. or greater, more preferably about 200° C. or greater and most preferably about 250° C. or greater at standard pressure or has a vapor pressure or less than 0.1 mbar at 20° C. Preferably the high boiling solvent exhibits a boiling point of about 350° C. or less. Any compound exhibiting these properties and which does not interfere in the adhesion of an isocyanate functional adhesive to a substrate may be used. Exemplary high boiling solvents include straight and branched alkylphthalates, such as diisononyl phthalate, dioctyl phthalate and dibutyl phthalate, a partially hydrogenated terpene commercially available as "HB-40", trioctyl phosphate, alkylsulfonic acid esters of phenol, toluenesulfamide, adipic acid esters, castor oil, xylene, 1-methyl-2-pyrrolidinone and toluene. Preferably the high boiling solvents are phthalates, and more preferred phthalates include branched chain alkyl phthalates, such as di-isononyl phthalates. The one or more high boiling solvents are present in sufficient amount to improve the interface of the organometallic compounds with the substrate surface. Preferably, the high boiling solvents are present in an amount of about 20 percent by weight or greater based on the weight of the solution, more preferably about 40 percent by weight or greater and most preferably about 90 percent by weight or greater. Preferably, the one or more high boiling solvents are present in an amount of about 99 percent by weight or less based on the weight of the composition, more preferably about 97.5 percent by weight or less and most preferably about 95 percent by weight or less.

The solution used to enhance the adhesion of an isocyanate functional surface comprises one or more organometallic compounds and one or both of one or more low boiling solvents and one or more high boiling solvents. The choice of ingredients impacts adhesion to different surfaces. The solution may comprise an organometallic compound, one or more low boiling solvents and one or more high boiling solvents. The solution may comprise an organometallic compound and one or more low boiling solvents. The solution may comprise an organometallic compound and one or more high boiling solvents.

The adhesive systems useful comprise isocyanate based (polyurethane or polyurea forming) curable systems which preferably comprise one or more isocyanate functional prepolymers. Isocyanate functional prepolymers contain on average more than one isocyanate functional group per molecule. The isocyanate functional prepolymer is present in the curable composition in a sufficient amount to form a cured component when exposed to curing conditions. In a one-part system the isocyanate functional prepolymer further comprises a catalyst and other components as described hereinafter. One component adhesive systems cure by contact with moisture. The adhesive compositions are capable of bonding substrates together such that the substrates remain bound together when exposed to temperatures of about −30° C. to 100° C. for long periods of time, such as 10 years; and up to temperatures of about 180° C. for short periods, up to 30 minutes.

The one or more isocyanate functional prepolymers are present in sufficient quantity to provide cohesive strength, and in adhesive uses, adhesive character to the cured compositions. Such isocyanate functional prepolymers have an average isocyanate functionality sufficient to allow the preparation of a crosslinked polyurethane upon cure and not so high that the isocyanate functional components are unstable. The isocyanate functional components preferably have a free isocyanate content which facilitates acceptable strength in the compositions prepared, preferably after 60 minutes. In one part compositions, the free isocyanate content is preferably about 0.05 percent by weight or greater based on the weight of the isocyanate functional prepolymer, and more preferably about 0.5 percent by weight or greater, and most preferably about 0.8 percent by weight or greater, and preferably about 10.0 percent by weight or less, more preferably about 5.0 percent by weight or less, even more preferably about 3.0 percent by weight or less. The isocyanate functional components preferably exhibit a polydispersity of about 2.5 or less, more preferably about 2.3 or less and most preferably about 2.1 or less. For two-part isocyanate based adhesive systems, the isocyanate content in the isocyanate functional prepolymers is preferably about 6 percent by weight or greater, more preferably about 8 percent by weight or greater and most preferably about 10 percent by weight or greater. For two-part isocyanate based adhesive systems, the isocyanate content in the isocyanate functional prepolymers is preferably about 35 percent by weight or less, more preferably about 30 percent by weight or less and most preferably about 25 percent by weight or less.

Preferably, the viscosity of the isocyanate functional prepolymers is about 200 Pa·s or less, and more preferably about 150 Pa·s or less, and most preferably about 120 Pa·s or less. Preferably, the viscosity of the isocyanate functional prepolymers is about 50 Pa·s or greater. The viscosity of the compositions can be adjusted with fillers. Below about 50 Pa·s a composition prepared from the isocyanate functional polymers may exhibit poor high speed tensile strength. Above about 150 Pa·s the isocyanate functional components, prepolymer, may be unstable and hard to pump. "Viscosity" as used herein is measured by the Brookfield Viscometer, Model DV-E with a RV spindle #5 at a speed of 5 revolutions per second and at a temperature of 23° C.

In a two-part curable system, the two parts are reactive with one another and when contacted undergo a curing reaction. One part of the composition comprises, or contains, one or more of isocyanate functional prepolymers wherein one or more of the prepolymers may contain isocyanate functional groups and alkoxysilane groups. This is referred to as the resin side or A side. The other component of the composition is a component reactive with the functional groups of the A side material, an isocyanate reactive component which comprises, or contains, one or more compounds, oligomers or prepolymers having on average more than one group reactive with isocyanate moieties as described herein. The second part is known as the curative or B side. Compounds having on average one or more isocyanate reactive groups can be prepolymers, small chain compounds, such as difunctional chain extenders or polyfunctional crosslinking agents, or mixtures thereof. A catalyst as described hereinbefore may be utilized in the curative side. The reaction product is a cured product which is capable of performing the desired function, such as bonding certain substrates together.

Preferably, the polyisocyanates useful in preparing the isocyanate functional prepolymers include any aliphatic, cycloaliphatic, araliphatic, heterocyclic or aromatic polyisocyanate, or mixtures thereof. Preferably, the polyisocyanates used have an average isocyanate functionality of about 2.0 or greater and an equivalent weight of about 80 or greater. Preferably, the isocyanate functionality of the polyisocyanate is about 2.0 or greater, more preferably about 2.2 or greater, and is most preferably about 2.4 or greater, and is preferably about 4.0 or less, more preferably about 3.5 or less, and most preferably about 3.0 or less. Higher functionality may also be used, but may cause excessive crosslinking, and result in a composition which is too viscous to handle and apply easily, and can cause the cured composition to be brittle. Preferably, the equivalent weight of the polyisocyanate is about 80 or greater, more preferably at about 110 or greater, and is most preferably about 120 or greater; and is preferably about 300 or less, more preferably about 250 or less, and most preferably about 200 or less. Examples of preferable polyisocyanates include those disclosed by Wu, U.S. Pat. No. 6,512,033 at column 3, line 3 to line 49, incorporated herein by reference. More preferred isocyanates are aromatic isocyanates, alicyclic isocyanates and derivatives thereof. Preferably, the aromatic isocyanates have the isocyanate groups bonded directly to aromatic rings. Even more preferred polyisocyanates include diphenylmethane diisocyanate and polymeric derivatives thereof, isophorone diisocyanate, tetramethylxylene diisocyanate, 1,6-hexamethylene diisocyan-ate and polymeric derivatives thereof, bis(4-isocyanatocyclohexyl)methane, and trimethyl hexa-methylene diisocyan-ate. The most preferred isocyanate is diphenylmethane diisocyanate. The amount of isocyanate containing compound used to prepare the isocyanate functional prepolymers is that amount that gives the desired properties, such as free isocyanate content and viscosities. Preferably, the isocyanates are used to prepare the isocyanate prepolymers in an amount of about 1.3 equivalents of isocyanate (NCO) per equivalent of active hydrogen or greater, more preferably about 1.4 equivalents of isocyanate or greater and most preferably about 1.5 equivalents of isocyanate or greater. Preferably, the polyisocyanates used to prepare the isocyanate functional prepolymers are used in an amount of about 2.0 equivalents of isocyanate per equivalent of active hydrogen or less, more preferably about 1.8 equivalents of isocyanate or less and most preferably about 1.6 equivalents of isocyanate or less.

Preferably the isocyanate functional prepolymers are the reaction product of one or more polyisocyanates and one or more isocyanate reactive compounds wherein an excess of polyisocyanate is present on an equivalents basis. Preferably the isocyanate reactive compounds comprise one or more polyols, preferably a mixture of one or more polyether diols and/or one or more polyether triols. Preferable polyols include those disclosed in Wu, U.S. Pat. No. 6,512,033 at column 4, line 10 to line 64, incorporated herein by reference, for example, polyether polyols, polyester polyols, poly(alkylene carbonate) polyols, hydroxyl containing polythioethers and mixtures thereof. Preferred polyols are polyether polyols containing one or more alkylene oxide units in the backbone of the polyol. Preferred alkylene oxide units are ethylene oxide, propylene oxide, butylene oxide and mixtures thereof. The alkylene oxides can contain straight or branched chain alkylene units. Preferably, the polyol contains propylene oxide units, ethylene oxide units or mixtures thereof. Mixtures of alkylene oxide can be arranged randomly or in blocks. In some preferred embodiments, the polyol comprises propylene oxide chains with ethylene oxide chains capping the polyol. Preferably the ethylene oxide capped polypropylene oxides are hydrophobic, and preferably contain less than about 20 mole percent of ethylene oxide and more preferably less than 10 mole percent of ethylene oxide in the backbone. Preferably, the isocyanate-reactive compound has a functionality of about 1.8 or greater, more preferably about 1.9 or greater, and is most preferably about 1.95 or greater, and is preferably about 4.0 or less, more preferably about 3.5 or less, and is most preferably about 3.0 or less. Preferably, the equivalent weight of the isocyanate-reactive compound is about 200 or greater, more preferably about 500 or greater, and is more preferably about 1,000 or greater, and is preferably about 5,000 or less, more preferably about 3,000 or less, and is most preferably about 2,500 or less. The compositions may further comprise one or more prepolymers containing one or more polyether polyols having dispersed therein or grafted to the backbone one or more organic based polymer particles. Preferable organic based polymer particles are based on thermoplastic polymers such as monovinylidene aromatic based polymers and copolymers of monovinylidene aromatic monomers with conjugated dienes, acrylates, methacrylates, unsaturated nitriles or mixtures thereof. The copolymers can be block or random copolymers. More preferably the particles comprise copolymers of unsaturated nitrites, conjugated dienes and a monovinylidene aromatic monomer, a copolymer of an unsaturated nitrile and a monovinylidene aromatic monomer or a polyurea. Even more preferably the particles comprise a polyurea or polystyrene-acrylonitrile copolymer with the polystyreneacrylonitrile copolymers being most preferred. The organic polymer particles are commonly available and well-known to those skilled in the art. The organic polymer particles preferably have a particle size which is large enough to improve the impact properties and elastomeric properties of the finally cured adhesive, but not so large so as to reduce the ultimate strength of the adhesive after cure. Preferably the particle size is about 10 microns or greater and more preferably the particle size is about 20 microns or greater. Preferably the particle size is about 50 microns or less and more preferably the particle size is about 40 microns or less. Preferably the polyols contain about 20 percent by weight or greater of organic polymer particles, preferably about 30 percent by weight or greater and more preferably about 35 percent by weight or greater. Preferably the polyols contain about 60 percent by weight or less of organic polymer particles, preferably about 50 percent by weight or less and more preferably about 45 percent by weight or less. The preferable polyols containing organic polymer particles are disclosed in Zhou, U.S. Pat. No. 6,709,539 at column 4, line 13 to column 6, line 18, incorporated herein by reference. Preferably, the polyols containing the organic particles comprise one or more polyether triols. Preferably prepolymers containing organic based polymer particles are present is sufficient amount to enhance the elastomeric nature and the modulus of the compositions. Preferably such prepolymers are contained in the composition in an amount of about 5 percent by weight or less and greater than 0 if present, preferably about 0.1 percent by weight or greater.

The isocyanate reactive compounds are present in an amount sufficient to react with most of the isocyanate groups of the isocyanates leaving enough isocyanate groups to correspond with the desired isocyanate content of the prepolymer. Preferably, the compounds containing isocyanate reactive groups are present in an amount of about 50 percent by weight or greater based on the prepolymer, more preferably about 65 percent by weight or greater and most preferably about 80 percent by weight or greater. Preferably, the compounds containing isocyanate reactive groups are present in an amount of about 90 percent by weight or less based on the prepolymer and most preferably about 85 percent by weight or less.

The isocyanate functional prepolymers may include isocyanate moieties and alkoxy silane moieties. All of isocyanate functional prepolymers may contain alkoxysilane moieties or such isocyanate functional prepolymers may be blended with isocyanate functional prepolymers which do not contain alkoxy silane moieties. The isocyanate functional prepolymers may contain sufficient alkoxy silane moieties to improve the adhesion to substrates, for instance glass and coated substrates. The alkoxy silane content in the isocyanate functional prepolymers is preferably about 0.2 percent by weight or greater, more preferably about 0.4 percent by weight or greater and most preferably about 0.8 percent by weight or greater. The alkoxy silane content in the isocyanate functional prepolymers is preferably about 6.0 percent by weight or less, more preferably about 5.0 percent by weight or less and most preferably about 4 percent by weight or less. Alkoxy silane content means the weight percentage of alkoxy silane moieties to the total weight of the prepolymer. Silanes having groups reactive with isocyanate moieties, can be reacted with the terminal isocyanate moieties of isocyanate functional prepolymers. Such reaction products are disclosed in U.S. Pat. Nos. 4,374,237 and 4,345,053 relevant parts incorporated herein by reference. Silanes having isocyanate reactive moieties reactive with isocyanate moieties may be reacted into the backbone of the prepolymer by reacting such silane with the starting materials during the preparation of the prepolymer such process is disclosed in U.S. Pat. No. 4,625,012, relevant portions incorporated herein by reference.

One-part polyisocyanate functional compositions and either or both of the resin part and the curative part for two-part isocyanate functional systems may contain plasticizers, fillers, pigments, stabilizers and other additives commonly present in curable polyurethane forming adhesives. By the addition of such materials, physical properties such as rheology, flow rates and the like can be modified. However, to prevent premature hydrolysis of the moisture sensitive groups of the isocyanate functional component, fillers should be thoroughly dried before admixture therewith.

The compositions preferably contain plasticizers, such as common plasticizers useful in polyurethane compositions. The plasticizers are present in an amount sufficient to disperse the isocyanate functional prepolymers in the final compositions. The plasticizers can be added to the composition either during preparation of the prepolymers, or during compounding of the composition. Exemplary plasticizers include straight and branched alkylphthalates, such as diisononyl phthalate, dioctyl phthalate and dibutyl phthalate, a partially hydrogenated terpenes, such as those commercially available as "HB-40", trioctyl phosphate, alkylsulfonic acid esters of phenol (Mesamoll, Bayer), toluene-sulfamide, adipic acid esters, castor oil, xylene, 1-methyl-2-pyrrolidinone and toluene. The plasticizers may branched plasticizers, such as branched chain alkyl phthalates(diisononyl phthalates (available under the Trademark PLATINOL N from BASF)). The amount of plasticizer used is that amount sufficient to give the desired rheological properties and disperse the components in the composition of the invention. Preferably, the plasticizer is present in about 1 percent by weight or greater of the composition, more preferably about 5 percent by weight or greater and most preferably about 10 percent by weight or greater. Preferably, the plasticizer is present in about 50 percent by weight or less of the composition and more preferably about 40 percent by weight or less.

The composition may comprise components to control the theology, viscosity, pumpability and the sag characteristics of the composition, such as one or more fillers or thixotropes. These materials are added in a sufficient amount such that the composition exhibits the desired rheology, viscosity and the sag characteristics. Any theology control component that provides acceptable theology for the desired use may be utilized, for example coated and uncoated calcium carbonate, fumed silica, organically modified fumed silicas, polyvinylchloride powder (which may be swollen in hydrocarbon solvents, such as aromatic hydrocarbons), polyureas, polyamide waxes, castor oil derivatives, organoclays, and the like. The theology control additives are added in a sufficient amount to control the flow of the material during and after application, the amount of control varies by application, for example an amount capable of maintaining the shape of an extruded shape, such as a triangular bead (25 mm tall, 10 mm wide), without movement on vertical surface after application, while maintaining a low enough viscosity to be applied. Preferably the theology control additives may be present in an amount of about 0.5 or greater based on the weight of the compositions, more preferably about 1.0 by weight or greater and most preferably about 2.0 by weight or greater. The theology control additives may be present in an amount of about 3 percent by weight or less based on the weight of the composition and more preferably about 2 percent by weight or less. Preferably these components are added such that the composition exhibits a press flow viscosity of about 8 grams per minute or higher, more preferably about 12 grams per minute or higher and most preferably about 16 grams per minute or higher to allow for application with a manual dispensing gun.

One or more types of fillers may be utilized in the composition for a variety of reasons such as to reinforce the composition, adjust viscosity and rheology, render the composition hand-gun applicability and strike a balance between cost and the desired properties of the composition and parts thereof. Exemplary classes of fillers include reinforcing fillers, clays, non-pigmented fillers, thixotropes and combinations thereof.

One preferred group of fillers are fillers that impart a balance of cost and viscosity to each part and comprise clays and non-pigmented fillers. Such fillers are used in a sufficient amount to impart an acceptable balance of viscosity and cost to the formulation and to achieve the desired properties of the composition. Among fillers useful for this purpose are clays, untreated and treated talc, and calcium carbonates. Preferred clays useful in the invention include kaolin, surface treated kaolin, calcined kaolin, aluminum silicates and surface treated anhydrous aluminum silicates. Kaolin is also known as Kaolinite and comprises compounds represented by the chemical formula $Al_2Si_2O_5(OH)_4$, and it most often occurs as clay-sized, platelike, hexagonally shaped crystals. The clays can be used in any form which facilitates formulation of a composition having the desired properties, for example a composition that can be utilized a hand-dispensable adhesive. Preferably, the clay is admixed in the form of pulverized powder, spray-dried beads or finely ground particles. Preferably, the clays or non-pigmented fillers are present in an amount sufficient to render the theology of the composition suitable to function as desired, such as an adhesive applicable by hand-gun. Preferably the clays or non-pigmented fillers may be used in an amount of about 0 percent by weight or greater of the composition, more preferably about 3 percent by weight or greater, and even more preferably about 5 percent by weight or greater, even more preferably about 10 percent by weight or greater and most preferably about 16 percent by weight or greater. Preferably, the clays or non-pigmented fillers may be used in an amount of about 60 percent by weight or less of the composition of the invention, more preferably about 50 percent by weight or less, more preferably about 30 percent by weight or less and most preferably about 23 percent by weigh or less.

The composition may comprise a reinforcing filler present to improve the strength and theology of the composition, which preferably comprises one or more forms of carbon black or titanium dioxide. The reinforcing filler is present in a sufficient amount to reinforce the composition and to improve the rheology of the composition. Preferably, the reinforcing filler is present in an amount such that the parts of the composition are nonconductive. Nonconductivity is generally understood to mean an impedance of the composition of at least $10^{10}$ Ohm-cm. When carbon black is used as the reinforcing filler, the carbon black used may be a standard carbon black. Standard carbon black is carbon black which is not specifically surface treated or oxidized to render it nonconductive. One or more nonconductive carbon blacks may be used in conjunction with the standard carbon black. The amount of standard carbon black in the composition is that amount which provides the desired color, viscosity, sag resistance and strength and is below the percolation threshold of the carbon black in the composition. The percolation threshold is the concentration at which the composition becomes conductive. If nonconductivity of the composition is desired, standard carbon black may be utilized at a level at which the composition is nonconductive. The non-conductive carbon blacks may be high surface area carbon blacks, which exhibits an oil absorption of about 110 cc/100 g or greater and preferably about 115 cc/100 g or greater and/or an iodine number of about 130 mg/g or greater and preferably about 150 mg/g or greater. Preferred non-conductive carbon blacks include ELFTEX™ 57100, MONARCH RAVEN™ 1040 and RAVEN™ 1060 carbon blacks. Standard carbon blacks are well known in the art and include RAVEN™ 790, RAVEN™ 450, RAVEN™ 500, RAVEN™ 430, RAVEN™ 420 and RAVEN™ 410 carbon blacks available from Columbian and CSX™ carbon blacks available from Cabot, and PRINTEX™ 30 carbon black available from Orion. The reinforcing filler is preferably present in the composition, based on the weight of the composition, in an amount of about 0 percent by weight or greater, more preferably about 10 percent by weight or greater and most preferably about 14 percent by weight or greater. The reinforcing filler is preferably present the composition, based on the weight of the composition, in an amount of about 30 percent by weight or less, more preferably about 25 percent by weight or less, and most preferably about 20 percent by weight or less.

The composition may further comprise a polyfunctional isocyanate for the purpose of improving the modulus of the composition in the cured form. Polyfunctional as used in the context of the isocyanates refers to isocyanates having a functionality of 3 or greater, and more preferably about 3.2 or greater. Preferably, the polyfunctional isocyanates have a nominal functionality of about 5 or less, even more preferably about 4.5 or less and most preferably about 4.2 or less. The polyfunctional isocyanates can be any isocyanates which are reactive with the isocyanate functional component and which improve the modulus of the cured composition. The polyisocyanates can be monomeric; trimeric isocyanurates or biurets of monomeric isocyanates; oligomeric or polymeric, the reaction product of several units of one or more monomeric isocyanates. Examples of preferred polyfunctional isocyanates include trimers of hexamethylene diisocyanate, such as those available from Bayer under the trademark and designation DESMODUR N3300. DESMODUR N3400 DESMODUR N-100, and polymeric isocyanates such as polymeric MDI (methylene diphenyl diisocyanates) such as those marketed by The Dow Chemical Company under the trademark of PAPI, including PAPI 20 and PAPI 27 polymeric isocyanates. The polyfunctional isocyanates are present in a sufficient amount to impact the modulus of the cured compositions of the invention. If too much is used, the cure rate of the composition is unacceptably slowed down. If too little is used, the desired modulus levels may not be achieved. The polyfunctional isocyanate is preferably present in an amount of about 1.0 percent by weight or greater based on the weight of the adhesive composition, more preferably about 2.0 percent by weight or greater and most preferably about 3.0 percent by weight or greater. The polyfunctional isocyanate is preferably present in an amount of about 15 percent by weight or less, based on the weight of the composition, more preferably about 13 percent by weight or less and most preferably about 11 percent by weight or less.

The compositions also contain one or more catalysts which catalyze the reaction of isocyanate moieties with water or an isocyanate reactive moiety containing compound, for example organotin compounds, metal alkanoates, tertiary amines and mixtures thereof. A mixture of a tertiary amine and a metal alkanoate or organotin compound is preferred, and more preferably mixtures comprise tertiary amines, such as dimorpholino diethyl ether, and organotin compounds, such as dibutyl tin dilaurate. Exemplary organotin compounds include alkyl tin oxides, stannous alkanoates, dialkyl tin carboxylates and tin mercaptides. Stannous alkanoates include stannous octoate. Alkyl tin oxides include dialkyl tin oxides, such as dibutyl tin oxide and its derivatives. The organotin compounds are preferably a dialkyltin dicar-boxylate or a dialkyltin dimercaptide. The preferred dialkyl dicarboxylates include 1,1-di-methyl-tin dilaurate, 1,1-dibutyltin diacetate and 1,1-dimethyl dimaleate. Preferred metal alkanoates include bismuth octoate or bismuth neodecanoate. The organo tin or metal alkanoate compounds are present in an amount of about 60 parts per million or greater based on the weight of the corn-position, more preferably 120 parts by million or greater. The organotin or metal alkanoates com-pounds are present in an amount of about 1.0 percent or less based on the weight of the com-position, more preferably 0.5 percent by weight or less and most preferably 0.1 percent by weight or less.

Exemplary tertiary amine catalysts include dimorpholinodialkyl ether, a di((di-alkylmorpholino)alkyl)ether, bis-(2-dimnethylaminoethyl)ether, triethylene diamine, pentamethyl-diethylene triamine, N,N-dimethylcyclohexylamine, N,N-dimethyl piperazine 4-methoxyethyl morpholine, N-methylmorpholine, N-ethyl morpholine, diazabicyclo compounds and mixtures thereof. A preferred dimorpholinodialkyl ether is dimorpholinodiethyl ether. A preferred di-((dialkylmorpholino)alkyl)ether is (di-(2-(3,5-dimethylmorpholino)ethyl)-ether). Diazabicyclo compounds are compounds which have diazobicyclo structures. Preferred diazabicyclo hydrocarbons include diazabicycloalkanes, diazabicyclo alkene salts and mixtures thereof. Preferred diazabicycloalkanes include diazabicyclooctane, available from Air Products under the trademark and designations, DABCO, DABCO WT, DABCO DC I, DABCO DC 2, and DABCO DC 21. Preferred diazabicycloalkene salts include diazabicycloundecene in the phenolate, ethylhexoate, oleate and formate salt forms, available from Air Products under the trademark and designations, POLYCAT SA 1, POLYCAT SA 1/10, POLYCAT SA 102 and POLYCAT SA 610. In some embodiments, one or more diazabicyclo compounds and one or more organometallic and/or other tertiary amine catalysts are present in the composition. Tertiary amines are preferably employed in an amount, based on the weight of the composition of about 0.01 percent by weight or greater, more preferably about 0.05 percent by weight or greater, even more preferably about 0.1 percent by weight or greater and most preferably about 0.2 percent by weight or greater and about 2.0 percent by weight or less, more preferably about 1.75 percent by weight or less, even more preferably about 1.5 percent by weight or less and most preferably about 1.0 percent by weight or less.

The composition may further comprise stabilizers, which function to protect the composition from moisture, thereby inhibiting advancement and preventing premature crosslinking of the isocyanates or silanol groups in the curable composition, such stabilizers include diethylmalonate, alkylphenol alkylates, paratoluene sulfonic isocyanates, benzoyl chloride, calcium oxide and orthoalkyl formates. Such stabilizers are preferably used in an amount of about 0.1 percent by weight or greater based on the total weight of the curable composition, preferably about 0.5 percent by weight or greater and more preferably about 0.8 percent by weight or greater. Such stabilizers are used in an amount of about 5.0 percent by weight or less based on the weight of the curable composition, more preferably about 3.0 percent by weight or less and most preferably about 2.0 percent by weight or less.

The composition may further comprise an adhesion promoter, such as those disclosed in Mahdi, U.S. Patent Publication 2002/0100550 paragraphs 0055 to 0065 and Hsieh, U.S. Pat. No. 6,015,475 column 5, line 27 to column 6, line 41 incorporated herein by reference. Preferred classes of adhesion promoters include silanes, titanates and zirconates and the like, preferably a silane in some form. Preferable methods of including silane functionality in the adhesive formulations are disclosed in Wu et al., U.S. Pat. No. 6,512,033 at column 5, line 38 to column 7, line 27; U.S. Pat. Nos. 5,623,044, 4,374,237; 4,345,053 and 4,625,012, relevant portions incorporated herein by reference. The silane may be blended with the composition, a silane, having active hydrogen moieties, can be reacted with a polyisocyanate to form an adduct which is blended with the composition, reacted with a polyurethane prepolymer or reacted with a polyisocyanate and a compound having on average more than one moiety reactive with an isocyanate moiety to form a prepolymer with both isocyanate and silane moieties (alkoxysilane groups). Preferably the adduct is a reaction product of a secondary amino- or mercapto-alkoxy silane and a polyisocyanate, the adduct having an average of at least one silane group and at least one isocyanate group per molecule (hereinafter "adduct"). Preferably such silane is a mercapto-silane, vinyl silane, epoxy silane, isocyanato-silane or an amino-silane and more preferably is a mercapto-trialkoxy-silane or an amino-trialkoxy silane, for example: N,N-bis[(3-triethoxysilyl) propylamine; N,N-bis [(3-tripropoxy-silyl) propyl] amine; N-(3-trimethoxysilyl) propyl-3-lN-(3-trimethoxysilyl)-propyl amino]propion-amide; N-(3-triethoxysilyl)propyl-3-[N-3-triethoxysilyl)-propyl-amino] propionamide; N-(3-trimethoxysilyl)propyl-3-[N-3-triethoxy silyl)-propylamino]propionamide; 3-trimethoxysilyl propyl 3-[N-(3-trimethoxysilyl)-propyl amino]-2-methylpropionate; 3-triethoxy silylpropyl3-[N-(3-triethoxysilyl)-propylamino]-2-methyl propion-ate; 3-trimethoxysilylpropyl3-[N-(3-triethoxysilyl)-propylamino]-2-methyl propionate; and the like. Preferably the organofunctional silane is gamma-mercaptopropyltrimethoxysilane (available as A 189 from Union Carbide) or N,N'-bis((3-trimethoxy silyl)propyl)amine. The amount of adhesion promoter present is that amount which enhances the adhesion of the composition to the substrate surface. The amount of adhesion promoter present is preferably about 0.01 percent by weight or greater based on the weight of the composition and most preferably about 0.1 percent by weight or greater. The amount of adhesion promoter used is preferably about 10 percent by weight or less and most preferably about 2.0 percent by weight or less. The adhesion promoter can be located in either or both parts of a two part composition.

The curable composition may comprise a hydrophilic material that functions to draw atmospheric moisture into the composition, to enhance the cure speed of the formulation. Preferably, the hydrophilic material is a liquid, including pyrrolidones such as 1 methyl-2-pyrrolidone (or N-methyl pyrrolidone). The hydrophilic material is preferably present in an amount of about 0.1 percent by weight or greater and more preferably about 0.3 percent by weight or greater and preferably about 1.0 percent by weight or less and most preferably about 0.6 percent by weight or less.

The two part compositions may comprise a curing agent located in the second part, which is a compound that contains greater than one isocyanate reactive functional group, preferably hydroxyl or amine functional groups. The curing agents can be one or more chain extenders, crosslinking agents, polyols or polyamines. Polyols as described hereinbefore can be utilized as curing agents. The polyols or polyamines can be prepolymers as described hereinbefore prepared utilizing excess equivalents of active hydrogen functional groups such that the resulting prepolymers contain active hydrogen functional groups, preferably hydroxyl and or amino groups. The curing agent may comprise one or more low molecular weight compounds having two or more isocyanate reactive groups and a hydrocarbon backbone wherein the backbone may further comprise one or more heteroatoms. It is advantageous to use such low molecular weight compounds in two-part compositions. Such low molecular weight compounds may be compounds known in the art as chain extenders, difunctional compounds, or crosslinkers, having, on average, greater than two active hydrogen groups per compound. Preferably, the molecular weight of the low molecular weight compound is about 250 or less, more preferably about 120 or less and more preferably about 100 or less. Preferably, the low molecular weight compound comprises one or more multifunctional alcohols, multifunctional alkanol amines, one or more adducts of multifunctional alcohol and an alkylene oxide, one or more adducts of a multifunctional alkanol amine and an alkylene oxide or a mixture thereof. The low molecular weight compound is used in a sufficient amount to obtain the desired G-Modulus (E-Modulus). In two-part compositions, the low molecular compound may be located in the resin side, the curative side or both, preferably the curative side. Preferably, the low molecular weight compound is present in composition in an amount of about 2 percent by weight or greater, more preferably about 3.0 percent by weight or greater and most preferably about 4.0 percent by weight or greater. Preferably, the low molecular weight compound is present in the composition in an amount of about 12 percent by weight or less, more preferably about 10 percent by weight or less and most preferably about 8 percent by weight or less. In a two-part composition, the curative part may further comprise polyoxyalkylene polyamine having 2 or greater amines per polyamine. Preferably, the polyoxyalkylene polyamine has 2 to 4 amines per polyamine and most preferably 2 to 3 amines per polyamine. Preferably, the polyoxyalkylene polyamine has a weight average molecular weight of about 200 or greater and most preferably about 400 or greater. Preferably, the polyoxyalkylene polyamine has a weight average molecular weight of about 5,000 or less and most preferably about 3,000 or less. Among preferred polyoxyalkylene polyamines are JEFFAMINE™ D-T-403 polypropylene oxide triamine having a molecular weight of about 400 and JEFFAMINE™ D-400 polypropylene oxide diamine having a molecular weight of about 400. The polyoxyalkylene polyamines are present in a sufficient amount to prevent the composition from sagging once mixed and applied. Preferably, the polyoxyalkylene polyamine is present in the curable composition in an amount of about 0.2 percent by weight or greater, more preferably about 0.3 percent by weight or greater and most preferably about 0.5 percent by weight or greater. Preferably, the polyoxyalkylene polyamine is present in the curable composition in an amount of about 6 percent by weight or less, more preferably about 5 percent by weight or less and most preferably about 4 percent by weight or less. In some preferred embodiments the curing agent comprises one or more polyols. Any polyol having groups reactive with isocyanate moieties, including those disclosed and preferred herein may be utilized. Particularly preferred polyols useful as curing agents include polyols having dispersed therein or grafted to their backbones organic particles as described herein, of which polyols having styrene acrylonitrile (SAN) particles dispersed therein or grafted to the backbone are particularly preferred. Curing agents are used in a sufficient amount such that the two part compositions cure to provide the desired properties as described herein. Preferably the curing agents, recited compounds or mixtures of recited compounds useful as curing agents including polyols, are present in an amount of about 10 percent by weight or greater of the second part, more preferably about 20 percent by weight or greater and most preferably about 30 percent by weight or greater. Preferably the curing agents are present in an amount of about 60 percent by weight or less of the second part, more preferably about 50 percent by weight or less and most preferably about 40 percent by weight or less.

Other components well known to the skilled artisan may be used in the compositions including ultraviolet stabilizers and antioxidants and the like. In compositions useful in preparing molded parts, the compositions may further comprise components commonly used in molding parts such as mold release agents, fillers, conductive components and the like. The compositions used to form foams may further comprise ingredients commonly used in foam forming compositions, such as blowing agents, mold release agents, skin forming agents and the like.

The compositions may also contain other durability stabilizers known in the art, including alkyl substituted phenols, phosphites, sebacates and cinnamates and preferably organophosphites. The durability stabilizers are preferably present in a sufficient amount to enhance the durability of bond of the adhesive composition to the substrate surface. Exemplary phosphites are disclosed in Hsieh et al. U.S. Pat. No. 7,416,599 column 10, line 47 to Column 11 line 25, incorporated herein by reference. Preferably, the durability stabilizers are present in the composition in an amount of about 0.1 percent by weight or greater and more preferably about 0.2 percent by weight or greater based on the weight of the composition. Preferably the durability stabilizers are present in the composition in an amount of about 1.0 percent by weight or less and more preferably about 0.5 percent by weight or less based on the weight of the composition.

The compositions may further include a light stabilizer, which facilitates the system maintaining durable bond to the substrate for a significant portion of the life of the structure to which it is bonded. Preferred light stabilizers are hindered amine light stabilizers, such as disclosed in Hsieh et al. U.S. Pat. No. 7,416,599 column 11, line 31 to line 63, incorporated herein by reference. More preferred hindered light amine stabilizers include Tinuvin 1,2,3 bis-(1-octyloxy-2,2,6,6, tetramethyl-4-piperidinyl) sebacate and Tinuvin 765, bis(1,2,2,6,6,-pentamethyl-4-piperidinyl) sebacate. Preferably, the light stabilizer is used in amount of about 0.1 percent by weight or greater based on the weight of the composition, more preferably 0.2 percent by weight or greater and most preferably about 0.3 percent by weight or. Preferably, the amount of light stabilizer present is about 3 weight percent or less based on the weight of the composition, more preferably about 2 weight percent or less and most preferably about 1 weight percent or less.

The composition may further comprise an ultraviolet light absorber which enhances the durability of the bond of the composition to a substrate, for example benzophenones and benzotriazoles and those disclosed in Hsieh et al. U.S. Pat. No. 7,416,599 column 11, line 64 to Column 12 line 29, incorporated herein by reference. More preferred UV light absorbers include Cyasorb UV-531 2-hydroxy-4-n-octoxy-benzophenone and Tinuvin 571 2-(2H-benzotriazol-2-yl)-6-dodecyl-4-methylphenol, branched and linear. The UV absorber may be used in an amount of about 0.1 percent by weight or greater based on the weight of the composition, more preferably about 0.2 weight percent or greater and most preferably about 0.3 weight percent or greater. The UV light inhibitor may be used in amount of about 3 percent by weight or less based on the weight of the composition, more preferably about 2 percent by weight or less and most preferably about 1 percent by weight or less.

The composition may be formulated by blending the components together using means well known in the art, such as in a suitable mixer. The blending is preferably conducted in an inert atmosphere, such as nitrogen or argon, in the absence of oxygen and atmospheric moisture to prevent premature reaction. Plasticizers may be added to the reaction mixture to enhance mixing and handling. Alternatively, the plasticizers can be added during blending of all the components. The ingredients are blended for a sufficient time to prepare a well blended mixture, preferably from about 10 to about 60 minutes. Once the composition is formulated, it is packaged in a suitable container such that it is protected from atmospheric moisture and oxygen.

The compositions may be used to bond a variety of substrates together, such as porous and nonporous substrates. The compositions are applied to a substrate and the composition on the first substrate is thereafter contacted with a second substrate. The surfaces to which the composition may be applied may be cleaned activated and/or primed prior to application of the composition, see for example, U.S. Pat. Nos. 4,525,511; 3,707,521 and 3,779,794, relevant parts are incorporated herein by reference. The compositions are applied at temperature at which they can be pumped. The one part adhesive compositions cure in the presence of atmospheric moisture, which is sufficient to result in curing of the composition. Curing can be accelerated by the addition of additional water or by applying heat to the curing composition by means of convection heat, microwave heating and the like. Preferably, the compositions are formulated to provide an open time of at least about 3 minutes or greater more preferably about 5 minutes or greater. "Open time" is understood to mean the time after application of the composition to a first substrate until it starts to become a high viscous paste and is not subject to deformation during assembly to conform to the shape of the second substrate and to adhere to it.

In use, the components of two-part compositions are blended as would normally be done when working with such materials. In two-part compositions, the volume ratio at which the two parts are combined is preferably a convenient whole number to facilitate application of the curable composition with conventional, commercially available dispensers including static and dynamic mixing. The blended polymerizable composition is extruded from the mixing chamber onto a substrate. When using electrically-driven equipment, dynamic mixing may be used Some common mix ratios are 1:1, 2:1, 4:1 and 10:1 and can also be odd ratios, preferably about 1:1.

Preferably, the mixed two-part compositions have a suitable viscosity to allow application without dripping. Preferably, the viscosities of the two individual components are of the same order of magnitude. For lower viscosities, the components may require gelling agent known in the art to prevent sag of the uncured composition. Two-part adhesive compositions start to cure upon mixing the two parts. Curing can be accelerated by applying heat to the curing adhesive using induction heat, convection heat, microwave heating and the like.

The catalyst used in the inventive system and process is dissolved in or dispersed in the solvent or dispersant utilizing standard blending techniques known to one skilled in the art. It is preferable to produce the catalyst solution or dispersion under a controlled atmosphere, for instance, in an inert gas environment.

The process of the invention is used to bond a variety of substrates together as described hereinbefore. The process can be used to bond porous and nonporous substrates together. The catalyst solution or dispersion is contacted with the substrate surface which is to be bonded by an adhesive. This contacting can be performed manually or with the use of a robotic applicator. The catalyst solution or dispersion can be applied by means of a spray applicator, brush, roller or by wiping it on to the surface. Robotic and manual equipment for such applications are well known to one skilled in the art. The solvent or dispersant is allowed to volatilize away. Preferably, the time period from application of the catalyst solution or dispersion to application of the adhesive to the substrate is about 0.5 minutes or greater, more preferably about 2.0 minutes or greater and most preferably about 5.0 minutes or greater. Preferably, the time period from application of the catalyst solution or dispersion to application of the adhesive to the substrate is about 300 minutes or less, more preferably about 60 minutes or less and most preferably about 30 minutes or less. After the solvent or dispersant volatilizes away, it is preferable that only the catalyst, and optionally the high boiling solvent, remain on the surface of the substrate to be bonded. In one embodiment, the treated surface of the substrate may have the catalyst, optionally the high boiling solvent, and a marker used to identify that the treatment has taken place. Alternatively, a process step of using a vision system can be used to insure the catalyst solution or dispersion was applied. This can involve either exposing the substrate to a light source that causes the marker to be visible or can be a thermal imaging system that identifies a temperature change due to evaporation of the solvent. Thereafter, the adhesive is contacted with the substrates.

The adhesive composition is applied to a first substrate at the location wherein the catalyst solution or dispersion was previously applied and the adhesive composition on the first substrate is thereafter contacted with a second substrate. In one embodiment, the first substrate is bonded to a second substrate with the adhesive disposed between the two substrates before the reactive adhesive is cured. In another embodiment, the second substrate is treated with the catalyst in a volatile solvent or dispersant on the portion of the surface to be contacted with the reactive adhesive. The catalyst solution or dispersion can be applied to one of more of the substrates prior to the time the adhesive is applied to each substrate. Generally, the adhesive is applied at a temperature at which the adhesive can be pumped. Preferably, the adhesive is applied at a temperature of about 10° C. or greater for application, more preferably at a temperature of about 18° C. or greater. Preferably, the polymerizable adhesive system is applied at a temperature of about 40° C. or less and more preferably at a temperature of about 35° C. or less. One-part latent curing adhesives begin cure upon exposure to the activation temperature of the catalyst. Curing can be accelerated by applying heat to the curing adhesive by means of induction, infrared, convection, microwave heating and the like. The invented process is especially useful when heat acceleration is utilized. For moisture curable adhesives, the speed of cure can be enhanced by addition of moisture to the atmosphere or by performing the cure in a humidity chamber. Preferably, the curable adhesive system is formulated to provide an open time of at least about 3 minutes or greater and more preferably about 5 minutes or greater. "Open time" is understood to mean the time after contacting the two parts, application of a one-part moisture cure adhesive, or activation of the latent catalyst in a one-part adhesive containing a latent catalyst, until the adhesive starts to become a high viscous paste and is not subject to deformation during assembly to conform to the shape of the second substrate and to adhere to it.

The process of the invention is preferably used to bond metal, coated metal (with e-coat or a paint system), plastic, fiber reinforced plastic, wood and/or glass together. In another embodiment, the compositions of the invention can be used to bond modular components to a car body or to each other. Examples of modular components include vehicle modules, such as a door, window, roof module or body. The process of the invention can be also used to bond exterior or interior trim to automobile bodies.

The process of the invention allows the adhesive composition to be capable of bonding to certain substrates in the absence of a primer or of any other treatment of the surface of the substrate, except application of the catalyst solution or dispersion. Examples of substrates which the adhesive composition bonds to without the need for primer or surface treatment include sheet molding compound (SMC), fiber reinforced plastics, such as polyester, and coated metals, e.g., e-coated aluminum and steel and painted metal sheets.

The adhesive system preferably exhibit a Lap Shear strength after 60 minutes from application of about 0.3 MPa or greater, more preferably about 0.5 MPa or greater and most preferably about 0.8 MPa or greater. The adhesive preferably exhibits a lap shear strength after complete cure of about 6.0 MPa or greater, more preferably about 7.0 MPa or greater and most preferably about 8.0 MPa or greater, determined according to DIN 53283. Preferably the system of the invention does not exhibit bubble formation during adhesive cure.

Each solution is applied to a substrate of ground carbon fiber reinforced epoxy or polyurethane substrate. A two part isocyanate functional adhesive (BETAFORCE 2816s or 2820 adhesive available from The Dow Chemical Company) is mixed and applied to the surface treated with each solution to form lap shear samples for testing. The adhesive applied is applied about 30 seconds or 60 minute after application of the solutions. The structures are subjected to infrared heating using a Germanflux IR heating device. The structures are preheated at a lamp power output of 70 percent. The samples are post heated for 30 seconds at 70 percent lamp power. The samples are tested for lap shear strength and are examined for bubble formation during curing.

TABLE 2

| | Example | | | | | | | | | | | |
|---|---|---|---|---|---|---|---|---|---|---|---|---|
| | 1* | 2 | 3 | 4 | 5 | 6 | 7 | 8 | 9 | 10 | 11 | 12* |
| Ingredient | | | | | | | | | | | | |
| Dimethyl tin dilaurate | | 1 | 1.5 | 1 | 2 | 1 | 2 | 1 | 2 | 1 | 2 | |
| 2,4,6-tris(dimethylamino-methyl) phenol | 0.9 | | | | | | | | | | | 0.9 |
| Diisononylphthalate | | | 73.5 | 99 | 98 | | | 89 | 88 | 20 | 20 | 20 |
| Di-C$_{8-10}$ alkylesters of 1,2-benzene-carboxylic acid | | | | | | 99 | 98 | | | | | |
| N-Methylpyrrolidone | | | 25 | | | | | | | | | |
| Heptane | 99.1 | 99 | | | | | | 10 | 10 | 79 | 78 | 79.1 |
| Sum | 100 | 100 | 100 | 100 | 100 | 100 | 100 | 100 | 100 | 100 | 100 | 100 |
| Properties | | | | | | | | | | | | |
| Lap Shear Strength 30 s open time MPa | 0.3 | 0.4 | 1.2 | 1.3 | 1.5 | 1.3 | 1.3 | 1.5 | 1.4 | 1.2 | 1.5 | 0.9 |
| Bubble Formation 30 s open time | Yes | Yes | No | No | No | No | No | No | No | No | No | Yes |
| Lap Shear Strength 60 min open time MPa | 0.4 | 0.2 | 1.5 | 1.2 | 1.3 | 1.5 | 1.2 | 1.2 | 1.3 | 1.4 | 1.3 | 1.07 |
| Bubble Formation 60 min open time | Yes | Yes | No | No | No | No | No | No | No | No | No | Yes |

*Comparative

The results show the use of non-reactive and non-volatile components like high boiling solvents reduces bubble formation, and the utilization of the right catalyst positively impacts the avoidance of bubbles. No differentiation can be made between 30 s and 60 min open time in regard of lap shear strength performance and bubble tendency. Example 13 in Table 3 is an example wherein no solution is applied to the substrate. Examples 1, 2 and 13 are tested with different waiting times between heating and lap shear testing on carbon fiber reinforced plastic wherein the surface is not ground. The isocyanate functional adhesive is a two part adhesive BETAMATE 2816 adhesive available from The Dow Chemical Company. The results are compiled in Table 3.

Illustrative Embodiments of the Invention

The following examples are provided to illustrate the invention, but are not intended to limit the scope thereof. All parts and percentages are by weight unless otherwise indicated.

The following ingredients are blended in a laboratory shake to form solutions utilized to prepare surfaces for bonding.

TABLE 1

| Ingredient | Tradename | Boiling Point ° C. |
|---|---|---|
| Dimethyl tin dilaurate | FOMREZ ™ UL 28 | |
| 2,4,6-tris(dimethylaminomethyl) phenol | ANCAMINE ™ K54 | 353 |
| Diisononylphthalate | VESTINOL ™ 9 | 270 |
| Di-C$_{8-10}$ alkylesters of 1,2-benzenecarboxylic acid | LINPLAST ™ 810 P | >250 |
| N-Methylpyrrolidone | | 203 |
| Heptane | | 98 |

TABLE 3

| Example | Time before testing | Lap Shear MPa | Failure Mode % | Bubble Formation |
|---|---|---|---|---|
| 1a | 2 min | 1.13 | 100 CF | Little |
| 1b | 20 hours | 3.36 | 50CF/50BF | Little |
| 2a | 2 min | 1.99 | 100 CF | No |
| 2b | 20 hours | 8.08 | 100 CF/ partial SD | No |
| 2c | 7 days | 7.9 | 85CF/15SD | No |
| 2d | 7 days and cataplasma | 4.7 | 100 CF/ partial SD | No |

TABLE 3-continued

| Example | Time before testing | Lap Shear MPa | Failure Mode % | Bubble Formation |
|---|---|---|---|---|
| 13a | 2 min | 0.52 | 50CF/50BF | yes |
| 13b | 20 hours | 3.6 | 100CF | yes |

Example 13a exhibits 0.52 MPa, 2 minutes after acceleration and 3.6 MPa after 20 hours from start of cure. Example 2a exhibits 1.99 MPa after 2 minutes and 8.08 MPa after 20 hours of curing. Example 1a and 1b show lower values, 2 Minutes after start of cure 1.13 MPa is reached, which is much lower compared to the result of Example 2a at 2 minutes. 20 hours after start of cure Example 1b reaches 3.36 MPa, which is significantly lower. The lap shear strength is impacted by a little bubble formation at the interface.

The disclosures of all articles and references, including patent applications and publications are incorporated by reference for all purposes. The following claims are incorporated by reference into this written description. Parts by weight as used herein refers to 100 parts by weight of the composition specifically referred to. Any numerical values recited in the above application include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value, and the highest value enumerated are to be considered to be expressly stated in this application in a similar manner. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

What is claimed is:

1. A composition for improving the adhesion of an isocyanate functional adhesive to a substrate including a fiber reinforced plastic, the composition comprising:
    a) 0.1 to about 5.0 weight percent of one or more organometallic compounds including one or more metals and a ligand, wherein the ligand includes an alkyl group, an ester, a carboxylic acid, an ether, a mercaptide, or any combination thereof, with the proviso that the organometallic compound including the carboxylic acid is a dialkyl metal carboxylate;
    b) one or more high boiling point solvents; and
    c) one or more low boiling point solvents selected from cycloaliphatic hydrocarbons, aliphatic hydrocarbons, aromatic hydrocarbons, ketones, and esters;
    wherein the composition does not contain a film forming resin;
    and the composition is a stable solution or dispersion of the one or more organometallic compounds in the solvents.

2. A composition according to claim 1, wherein the metal in the one or more organometallic compounds is tin, bismuth or zinc.

3. A composition according to claim 1, wherein
    a) the one or more organometallic compounds are present in an amount of 0.1 to 5.0 percent by weight;
    b) the one or more high boiling point solvents are present in an amount of about 10 to about 98.9 percent by weight; and
    c) the one or more low boiling point solvents are present in an amount of about 1 to about 89.9 percent by weight.

4. A composition according to claim 3, wherein
    a) the one or more organometallic compounds are present in an amount of 0.1 to about 2.5 percent by weight;
    b) the one or more high boiling point solvents are present in an amount of about 10 to about 50 percent by weight; and
    c) the one or more low boiling point solvents are present in an amount of about 30 to about 70 percent by weight.

5. A composition according to claim 1, wherein the one or more high boiling point solvents are liquid at ambient temperatures and exhibit a boiling point under ambient temperatures and pressures at sea level of about 180° C. or greater.

6. A composition according to claim 1, wherein the one or more high boiling point solvents are liquid at ambient temperature and exhibit a boiling point at ambient temperature and pressure of about 200° C. to about 350° C.

7. A kit comprising;
    i) the composition of claim 1; and
    ii) an isocyanate functional adhesive separate from the composition.

8. A kit according to claim 7, wherein the isocyanate functional adhesive is a one part adhesive.

9. A kit according to claim 7, wherein the isocyanate functional adhesive is a two part adhesive.

10. A composition according to claim 1, wherein
    the composition is adapted to contact a surface or a portion of the surface of a first substrate comprising fiber reinforced composite and wherein the one or more organometallic compounds and the one or more high boiling point solvents are adapted to remain on the surface or portion of the surface of the first substrate prior to contacting an isocyanate functional adhesive with the surface or a portion of the surface of the first substrate contacted with the composition applied thereto,
    contacting the first substrate with a second substrate with the isocyanate functional adhesive disposed between the two substrates, and allowing the isocyanate functional adhesive to cure and bond the two substrates together.

11. A composition according to claim 10, wherein the substrates with adhesive disposed between the two substrates are adapted to be heated at about 70° C. to about 150° C.

12. A composition according to claim 10, wherein the one or more high boiling solvents are liquid at ambient temperatures and exhibit a boiling point under ambient temperatures and pressures at sea level of about 180° C. or greater.

13. A composition according to claim 10, wherein the substrates with adhesive disposed between the two substrates are adapted to be heated for about 0.5 minutes to about 15 minutes.

14. A composition according to claim 10, wherein heating is adapted to be performed by induction means.

15. A composition according to claim 3, wherein
   a) the one or more organometallic compounds are present in an amount of 0.1 to about 2.5 percent by weight;
   b) the one or more high boiling point solvents are present in an amount of about 10 to about 30 percent by weight; and
   c) the one or more low boiling point solvents are present in an amount of about 50 to about 70 percent by weight.

16. A composition according to claim 10, wherein the one or more low boiling point solvents are adapted to volatilize away prior to the adhesive being applied to the first substrate.

17. A composition according to claim 1, wherein the one or more high boiling point solvents are selected from straight and branched alkylphthalates, a partially hydrogenated terpene, trioctyl phosphate, alkylsulfonic acid esters of phenol, toluene-sulfamide, adipic acid esters, castor oil, and 1-methyl-2-pyrrolidinone.

18. A composition according to claim 1, wherein the one or more high boiling point solvents comprise phthalates.

19. A composition according to claim 1, wherein the one or more low boiling point solvents are liquid at ambient temperatures and are volatile at temperatures of about 15° C. to about 180° C. at standard pressure.

20. A structure comprising:
   i) a first substrate including a fiber reinforced plastic, bonded to
   ii) a second substrate by
   iii) an isocyanate functional adhesive; wherein
   iv) a layer formed from the composition of claim 1 is interposed between the first substrate and the isocyanate functional adhesive.

* * * * *